(12) United States Patent  
LeVey

(10) Patent No.: US 6,499,923 B2
(45) Date of Patent: Dec. 31, 2002

(54) FASTENER WITH PANEL MOUNTING SYSTEM

(75) Inventor: Kenneth R. LeVey, West Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/757,007

(22) Filed: Jan. 8, 2001

(65) Prior Publication Data

US 2002/0090277 A1 Jul. 11, 2002

(51) Int. Cl.[7] .............................. F16B 37/02; F16B 21/00
(52) U.S. Cl. ..................... 411/172; 411/85; 411/182; 411/553
(58) Field of Search ........................... 411/84, 85, 173, 411/174, 175, 182, 172, 553

(56) References Cited

U.S. PATENT DOCUMENTS

| | | | |
|---|---|---|---|
| 2,395,650 A | * | 2/1946 | Allen ........................... 411/84 |
| 2,968,329 A | * | 1/1961 | Reiner ......................... 411/84 |
| 3,304,980 A | * | 2/1967 | Koehl .................... 411/173 X |
| 4,432,681 A | | 2/1984 | Capuano |
| 4,543,023 A | | 9/1985 | Capuano |
| 4,637,766 A | | 1/1987 | Milliser |
| 4,690,599 A | | 9/1987 | Shinjo |
| 5,271,586 A | * | 12/1993 | Schmidt ................... 411/85 X |
| 5,445,483 A | | 8/1995 | Fultz |
| 5,808,266 A | | 9/1998 | Cecil |
| 6,108,893 A | | 8/2000 | Wojciechowski et al. |

* cited by examiner

*Primary Examiner*—Neill Wilson
(74) *Attorney, Agent, or Firm*—Mark W. Croll; Paul F. Donovan; Lisa M. Soltis

(57) ABSTRACT

A fastener is configured for engagement upon a panel having a panel opening, and for engaging a mating fastener through the panel opening. The fastener includes a body having an axis of rotation, a peripheral edge, a main portion and a panel end. At least two lugs project from the peripheral edge at the panel end and are the points of fixed engagement with the panel without causing yielding of the panel or of the fastener. In another embodiment, a fastener system includes a fastener having a body with at least two lugs projecting from the body, a panel with an opening and at least two pocket formations disposed relative to the opening to receive the lugs and place the body in registry with the opening. The lugs lockingly engage the pocket formations as the body is rotated, the engagement being achieved without causing yielding the fastener or the panel.

20 Claims, 4 Drawing Sheets

FASTENER WITH PANEL MOUNTING SYSTEM

BACKGROUND OF THE INVENTION

The present invention relates to fasteners, and more particularly to fasteners used to secure items to panels. Specifically, the present invention relates to threaded fasteners designed to be secured to a panel.

Conventional panel fasteners provide a threaded nut, a bolt, a rod or other type of fastener that is engageable in registry with an opening in a panel of sheet material, such as rigid plastic, aluminum or sheet metal. A device is secured to the panel through engagement of the engaged panel fastener, and a corresponding fastener portion.

There are two main technologies used to secure panel fasteners to panels. The first is welding, used when the panels are aluminum or sheet metal. One problem of welding fasteners to aluminum is that a large capital investment is required in providing systems for accurately locating the fastener on the panel, and for consistently and completely welding the fastener to the panel.

In mass production applications, statistical process control (SPC) is employed to ensure consistent quality products. In the event a single weld fails or is otherwise found to be inadequate or unsatisfactory, the requirements of SPC call for the recalling or examination of all related and/or inventoried components that may suffer a similar deficiency or defect. Thus, a failed weld on a single panel fastener worth pennies can involve a disruption in manufacturing costing thousands of dollars. In addition, the cost of operating and maintaining a mass production welding operation is considerable.

The other main technology used to secure panel fasteners to panels is used to produce products known as Smak Nuts, clinch fasteners or Pierce fasteners, and are disclosed in U.S. Pat. No. 5,445,483. In this type of system, the panel fastener is forced into the panel opening, and causes yielding, also referred to as cold forming or deformation of the panel and/or the fastener to create a tight friction fit.

As is the case with welding, the latter technology also requires large capital investment, in this case taking the form of hydraulic presses to apply the pressure needed for pressing the fastener into the panel opening. Thus, there are high equipment and labor costs associated with securing panel fasteners to panels with Smak Nut, Pierce or clinch nut technology.

Another disadvantage of existing technologies used to secure panel fasteners to panels is that relatively low torque forces, measured in Newton Metres, are required to cause the fastener to become detached or disengaged from the panel. Where manufacturing process employs SPC, these technologies entail significant monitoring, evaluation and correction costs in the event of a failure.

Thus, a first object of the present invention is to provide an improved type of panel fastener technology which requires neither welding nor yielding of the panel or the fastener itself.

Another object of the present invention is to provide an improved type of panel fastener in which locking engagement of the fastener upon the panel is achieved merely by assembly of the fastener upon the panel.

Yet another object of the present invention is to provide an improved type of panel fastener which features relatively high torque failure values.

Still another object of the present invention is to provide an improved type of panel fastener which is installed using hand tools or automation.

BRIEF SUMMARY OF THE INVENTION

The above-identified objects are met or exceeded by the present fastener and panel mounting system, which features a fastener with at least two extending lug formations which project beyond a periphery of the fastener body. On the panel, a like plurality of pocket formations or raised bosses or shear forms are configured and arranged to receive the lugs, and, as the fastener is rotated, lockingly retain the lugs so that the fastener is secured. In this manner, the fastener is securely held to the panel against significant rotational torque forces and without the drawbacks of welding or yielding, as in prior designs.

More specifically, a fastener is provided which is configured for engagement upon a panel having a panel opening, and constructed and arranged for engaging a mating fastener through the panel opening. The fastener includes a body having an axis of rotation, a peripheral edge, a main portion and a panel end. At least two lugs project from the peripheral edge at the panel end and are configured for being the points of fixed engagement with the panel without causing yielding of the panel or of the fastener.

In another embodiment, a fastener system is provided, including a fastener having a body with at least two lugs projecting from the body, a panel with an opening and at least two pocket formations disposed relative to the opening to receive the lugs and place the body in registry with the opening. The lugs are configured to lockingly engage the pocket formations as the body is rotated, the engagement being achieved without causing yielding the fastener or the panel.

In the preferred embodiment, each of the lugs is provided with an inclined or ramped upper surface to facilitate rotational sliding engagement with the pocket formations, and a lower surface with locking formations. Upon rotational engagement of the fastener with the pocket formation, the locking formation matingly engages an aperture defined by the pocket formation, to positively retain the fastener upon the panel.

DETAILED DESCRIPTION OF THE INVENTION

Figure 1:
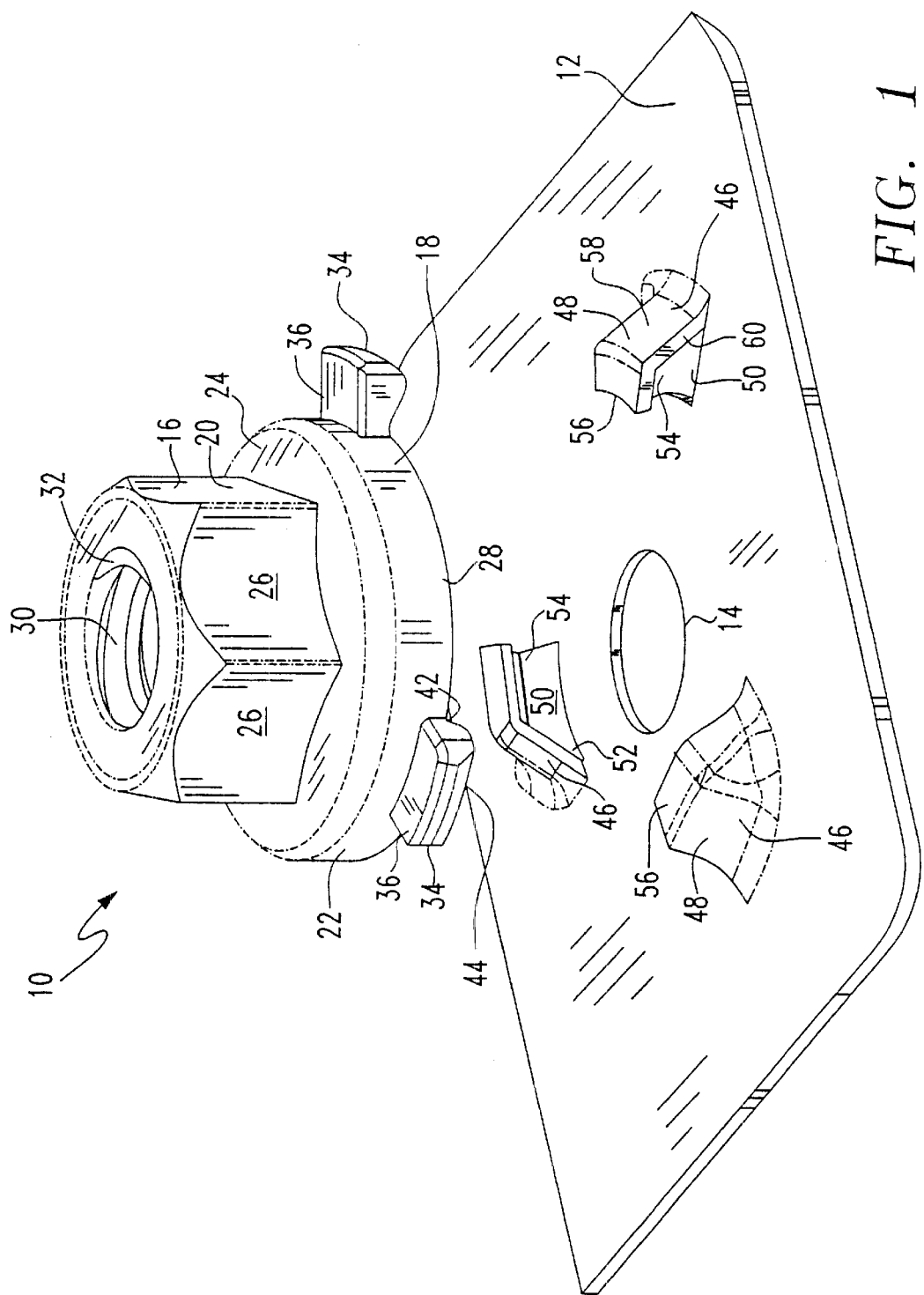
FIG. 1 is an exploded perspective view of the present fastener and panel assembly.
Figure 2:
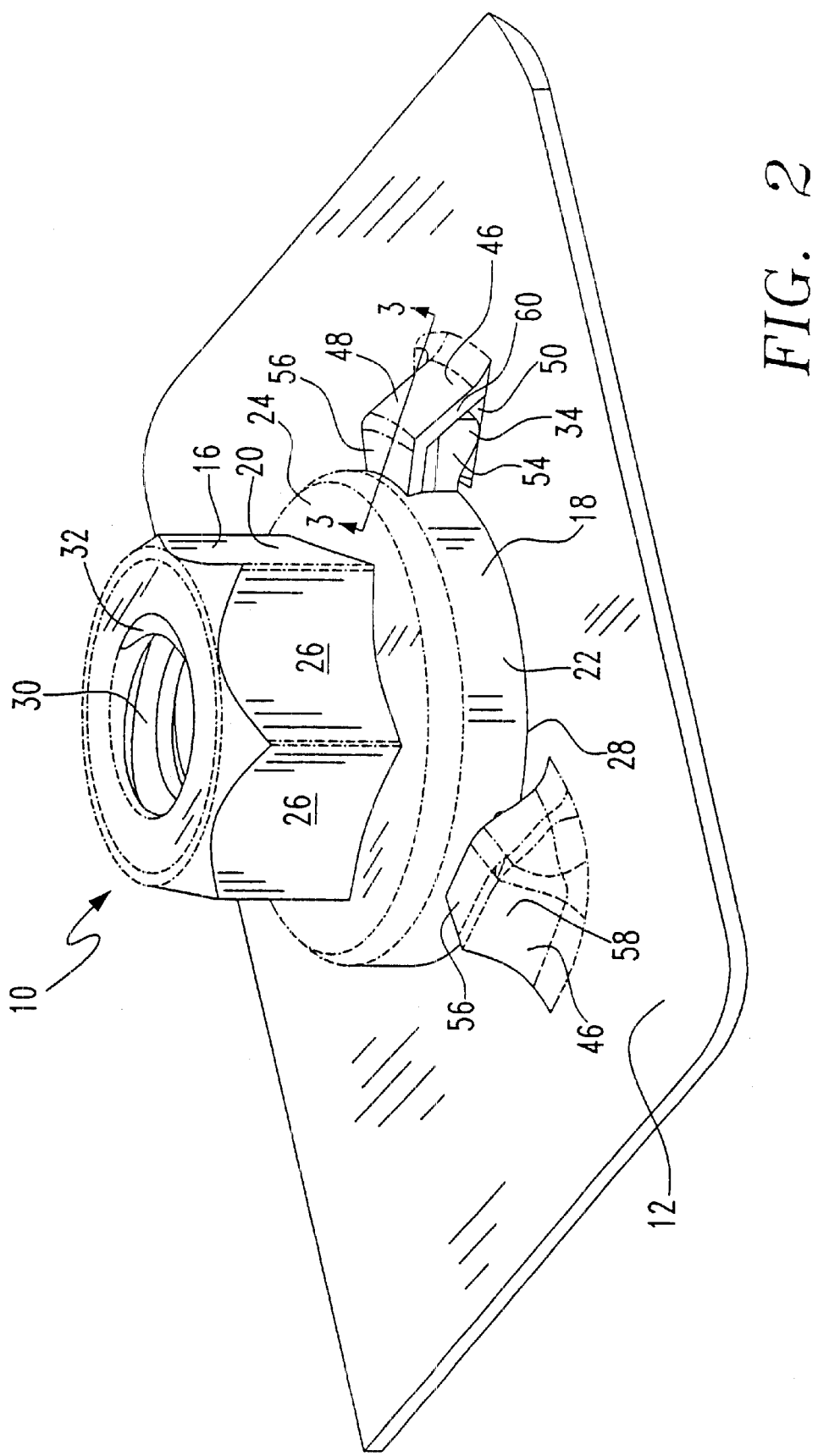
FIG. 2 is a perspective view of the assembly of FIG. 1 shown in the engaged position.

Referring now to FIGS. 1 and 2, the present fastener is generally designated 10 and is depicted as a nut. However, it is contemplated that a bolt, a rod or other conventionally known panel fastener may be alternatively and equivalently provided with the structure of the present invention to achieve the benefits and advantages described herein. The fastener 10 is configured for engagement upon a panel 12 having or defining a panel opening 14, and is constructed and arranged for engaging a mating fastener (not shown) through the panel opening. As illustrated, the panel fastener 10 is configured for matingly engaging a threaded bolt or screw. Similarly, if the fastener 10 attached to the panel 12 is a bolt, the mating engagement is with a nut. Also, while the panel 12 is depicted as being a square, it is contemplated that the dimensions and configuration of the panel may vary to widely to suit the application, which includes, but is not limited to automotive applications.

The fastener 10 has a body 16 having an axis of rotation, a peripheral edge 18, a main portion 20 and a panel end 22. In the preferred embodiment, the panel end 22 has a larger diameter than the main portion 20, and defines a shoulder 24. The main portion is preferably provided with a plurality of facets 26 arranged in a hexagon for engagement by a wrench or socket, which facilitates installation of the fastener 10 upon the panel with hand tools, or using automatic assembly equipment. However, other configurations are contemplated depending on the application. Also, the panel end 22 has a generally planar surface 28 for engaging the panel 12.

The body 16 defines a throughbore 30 which is preferably provided with threads 32 for threadably engaging the mating fastener (not shown). It is preferred that the throughbore 30 pass through both the main portion 20 and the panel end 22.

At least two lugs 34 project from the peripheral edge 18 at the panel end 22, and are configured for being the points of fixed engagement with the panel 12 without causing yielding of the panel or of the fastener 10. Instead, as will be described in greater detail below, the lugs 34 enable the fastener 10 to lockingly engage the panel 12 merely by rotational engagement of the fastener with the panel 12. In the preferred embodiment there are three lugs which project radially from the body 16, specifically from the panel end 22, and which are relatively equally spaced from each other. To facilitate assembly with automatic sorting, installation and material handling equipment, the lugs 34 are preferably aligned with a corresponding one of the facets 26. Also, the lugs 34 are each preferably generally box-shaped. However, the number, shape and disposition of the lugs 34 may vary to suit the application.

Figure 3:
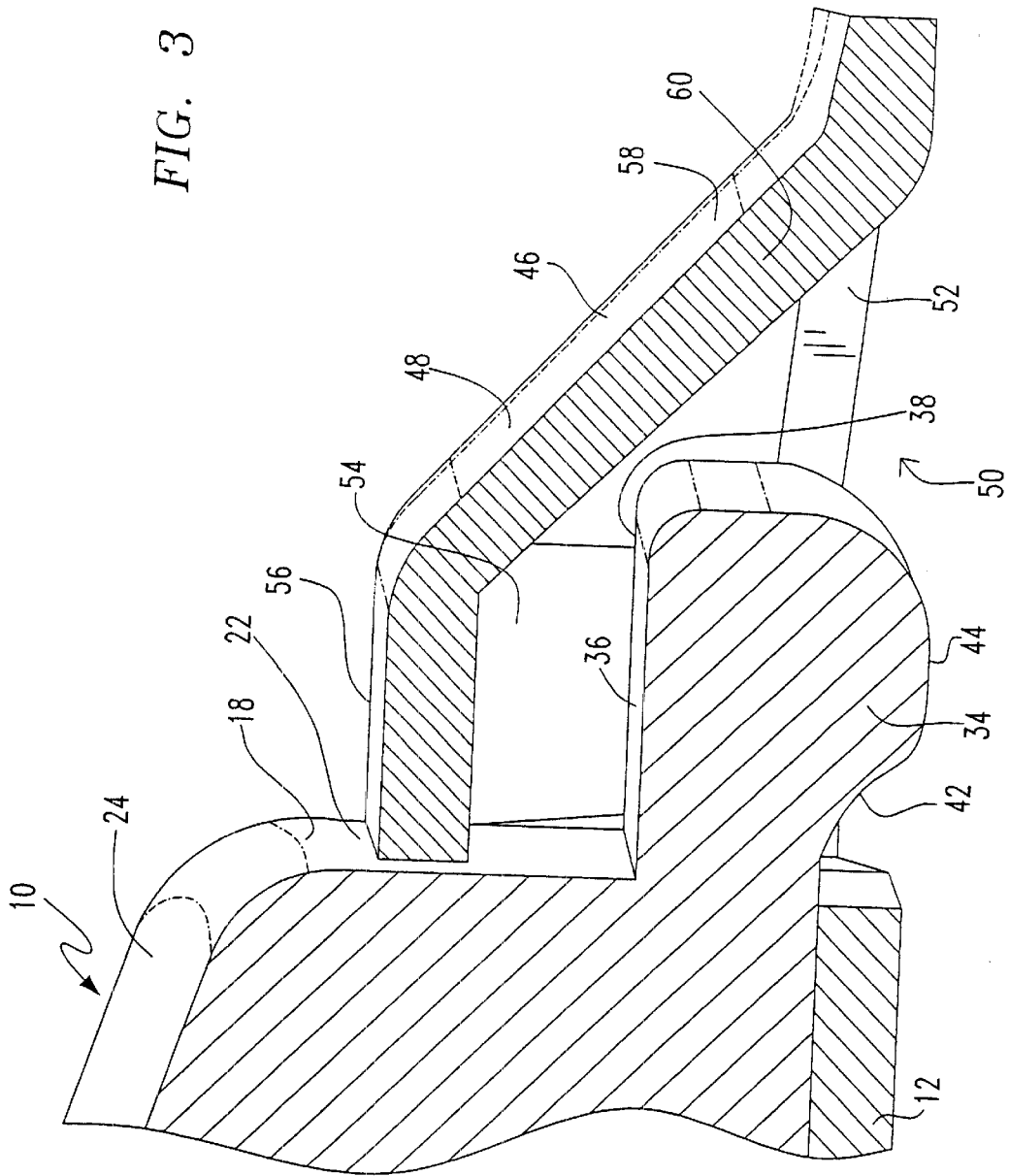
FIG. 3 is a fragmentary sectional view taken along the line 3—3 of FIG. 2 and in the direction indicated generally.
Figure 5:
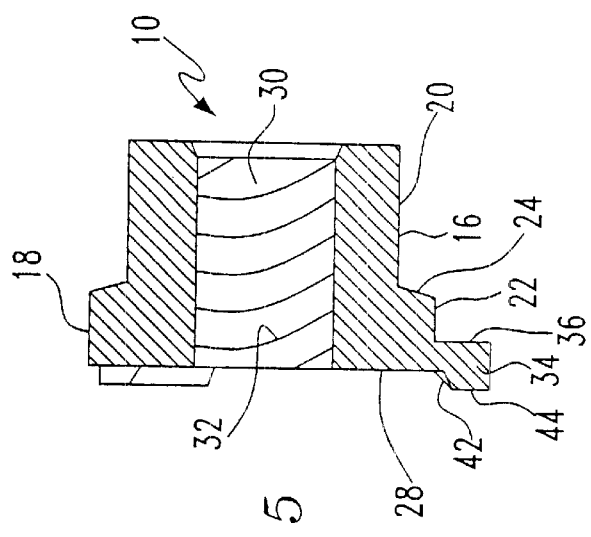
FIG. 5 is a section taken along the line 5—5 of FIG. 4 and in the direction indicated generally.
Figure 4:
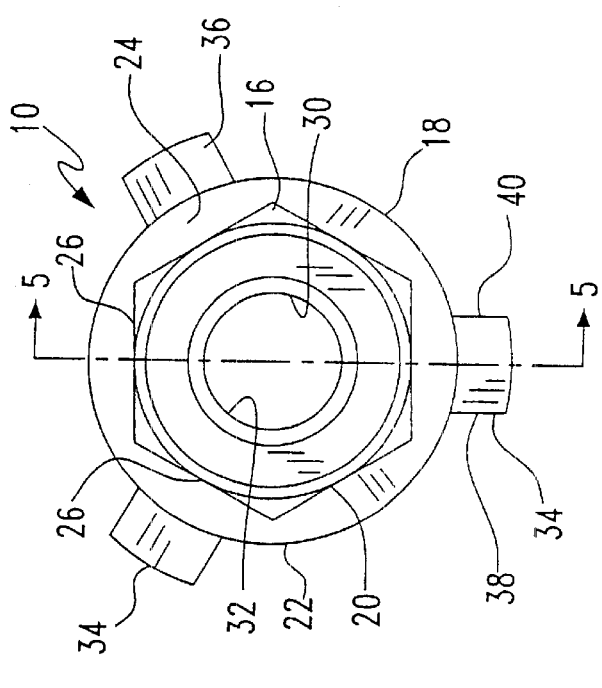
FIG. 4 is an overhead plan view of the present fastener.
Figure 6:
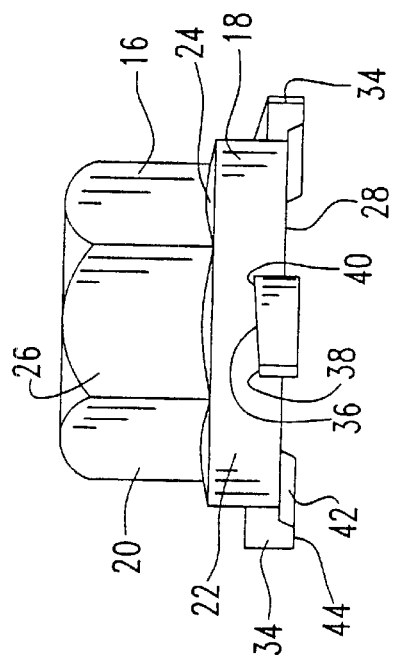
FIG. 6 is an elevational view of the present fastener.

Referring now to FIGS. 1, 3 and 6, at least one and preferably all of the lugs 34 have an inclined upper surface 36, which at a lower end 38 facilitates the engagement with the panel 12, and at a relatively taller end 40, increases the frictional engagement with the panel, as will be described below.

In addition, at least one and preferably all of the lugs 34 have a lower surface 42 with at least one locking formation 44 depending from the lower surface. In the preferred embodiment, the locking formation 44 is a generally convex extension which runs along the length of the lug 34. However, it is contemplated that the configuration of the locking formation 44 may vary to suit the application.

Referring now to FIGS. 1–3, the construction of the panel 12 will be explained in greater detail. Specifically, a main feature of the panel 12 is the provision of a plurality of pocket formations 46, also referred to as raised bosses or shear forms, which are configured and arranged to receive the lugs 34, and, as the fastener 10 is rotated, lockingly retain the lugs so that the fastener is secured. In the preferred embodiment, there are at least two and preferably as many of the pocket formations 46 as there are lugs 34. Thus, there are preferably three pocket formations 46 in the depicted embodiment. It is also contemplated that there may be more pocket formations 46 than lugs 34, depending on the application.

As shown, the pocket formations 46 are regularly spaced about the panel opening 14. As is well known in the art, apertures may be spaced from each other a distance equal to or greater than twice the thickness of the material without sacrificing the structural integrity of the panel. The reason the pocket formations 46 are also referred to as shear forms is that a wall 48 of the formation is formed from the panel 12 by stamping, which creates an aperture 50 in the panel due to the removal of material which forms the wall 48. An endwall 52 of the aperture 50 serves as a stop for the lug 34. Also, the wall 48 is displaced axially from the panel 12 in the stamping process to define a pocket 54 dimensioned to receive the lug 34. As described above, the inclined configuration of the upper surface 36 of the lug 34 facilitates the location and entry of the lug into the pocket 54, and between an underside of the wall 48 and the panel 12.

More specifically, the wall 48 preferably includes a lip portion 56 which is generally parallel to the panel 12, and a ramped portion 58. The pocket formations 46 are preferably oriented on the panel 12 so that all of them have an open end 60 which is arranged to receive the corresponding lug 32 as the fastener 10 is rotated relative to the panel, with the throughbore 30 in registry with the panel opening 14 (best seen in FIG. 2).

Upon engagement of the fastener 10 with the formations 46, the fastener is rotated until the locking formations 44 are matingly received in the apertures 50, and until the lugs, 34, and specifically the locking formations 44, engage the endwall or stop 52 (best seen in FIG. 3). Once the fastener 10 is thus engaged with the panel 12, further rotation in the same direction is prevented due to the engagement of the lugs 34 with the endwalls 52. Counter rotation is also prevented by engagement of the locking formations in the apertures 50 and contact with a wall 62 opposite the endwall 52.

An important feature of the present system is that the fastener 10 is retained upon the panel 12 without the use of welding or yielding, and also the retention is significantly stronger than conventional attachment techniques. Specifically, it has been found that the torque required to remove the fastener 10 from the panel is greater than that needed to remove conventional welded or yielded panel fasteners, which means that the present system is far stronger and less prone to failure.

For example, a conventional welded nut-type panel fastener is typically specified to have a 90 Newton-Metre (Nm) torque value for removal from the panel. In contrast, in the present system, once the fastener 10 is engaged on the panel, values in the range of 175–180 Nm were required to remove the fastener from the panel. While the present fastener 10 and the pocket formations 46 are designed for clockwise installation, counterclockwise installation is also contemplated.

Further, the force required to push the fastener 10 from the panel 12 when applied axially was found to be in the range of 5,000–5900 Newtons. For comparison purposes, only about 13–18 Nm were required to rotatably install the fastener 10 in the panel 12. Also, the 175–180 Nm clockwise removal torque far exceeds the installation torque of the fastener (here a bolt) which is engaged with the fastener 10 to retain an object to the panel 12 during subsequent assembly. This is the prime cause for failure of conventional panel fasteners. Another advantage of the present fastener system is that subsequent corrosion of the fastener 10 with the panel 12, or with the mating fastener, will not reduce the integrity of the engagement of the fastener 10 with the panel 12. Still another advantage of the present system is that the fastener 10 is installed upon the panel 12 without requiring expensive welding or cold forming equipment, thus reducing manufacturing costs.

While specific embodiments of the fastener with panel mounting system of the present invention have been shown and described, it will be appreciated by those skilled in the art that changes and modifications may be made thereto without departing from the invention in its broader aspects and as set forth in the following claims.

What is claimed is:

1. A fastener configured for engagement upon a panel having a panel opening, and constructed and arranged for engaging a mating fastener through the panel opening, comprising:

a body having an axis of rotation, a peripheral edge, a main portion and a panel end;

at least two lugs projecting from said peripheral edge at said panel end and configured for being the points of fixed engagement with the panel without causing yielding of the panel or of said fastener, wherein at least one of said lugs has an inclined surface.

2. The fastener of claim 1 wherein each of said lugs has an inclined upper surface and a lower surface with at least one depending locking formation.

3. The fastener of claim 1 wherein at least one of said lugs projects radially from said panel end.

4. The fastener of claim 1 wherein said main portion has a faceted outer surface.

5. The fastener of claim 1 wherein said body defines a throughbore.

6. The fastener of claim 5 wherein said throughbore is threaded.

7. A fastener configured for engagement upon a panel having a panel opening, and constructed and arranged for engaging a mating fastener through the panel opening, comprising:

a body having an axis of rotation, a peripheral edge, a main portion and a panel end;

at least two lugs projecting from said peripheral edge at said panel end and configured for being the points of fixed engagement with the panel without causing yielding of the panel or of said fastener, wherein at least one of said lugs has a lower surface and at least one locking formation depending from said lower surface.

8. A fastener configured for engagement upon a panel having a panel opening, and constructed and arranged for engaging a mating fastener through the panel opening, comprising:

a body having an axis of rotation, a peripheral edge, a main portion and a panel end;

at least two lugs projecting from said peripheral edge at said panel end and configured for being the points of fixed engagements with the panel without causing yielding of the panel or of said fastener, wherein said panel end has a diameter which is greater than a diameter of said main portion.

9. A fastener system, comprising:

a fastener having a body with at least two lugs projecting from said body, a panel with an opening and at least two pocket formations disposed relative to said opening to receive said lugs and place said body in registry with said opening, each said pocket formation defining an aperture in said panel, and said corresponding lug having a depending formation which engages said aperture, said lugs configured to lockingly engage said pocket formations as said body is rotated, said engagement being effected without causing yielding of said fastener or said panel.

10. The system of claim 9 wherein at least one of said pocket formations includes a stop for engaging a corresponding one of said lugs and preventing further rotation of said body.

11. The system of claim 9 wherein at least one of said lugs includes an inclined upper surface for facilitating engagement with said pocket formation.

12. The system of claim 10 wherein said fastener and said panel are configured so that, upon engagement of said lugs with said corresponding pocket formations, as said fastener is rotated, said depending formations engage said aperture, and further rotation of said fastener relative to said opening is prevented by engagement between said lugs and said stop.

13. The system of claim 12 wherein said fastener body defines a throughbore, and upon engagement of said lugs in said pocket formations, said throughbore is in registry with said opening.

14. The system of claim 13 wherein said throughbore is threaded.

15. A fastener for use in a system including a panel with a panel opening surrounded by at least two panel shear forms, said fastener comprising:

a body having an axis of rotation, a peripheral edge, a main portion and a panel end; and at least two lugs projecting from said peripheral edge at said panel end and each configured for engaging a corresponding one of the shear forms and being locked therein upon rotation without causing yielding of the panel or of said fastener, each of said lugs having an inclined upper surface and a lower surface with at least one depending locking formation.

16. The fastener of claim 15 wherein the panel has a panel opening, and said body defines a throughbore which is in registry with the opening upon engagement of said lugs in said shear forms.

17. The fastener of claim 15 wherein each said lug projects radially from said panel end.

18. A fastener configured for engagement upon a panel having a panel opening, and constructed and arranged for engaging a mating fastener through the panel opening, comprising:

a body having an axis of rotation, a peripheral edge, a main portion and a panel end;

at least three lugs projecting from said peripheral edge at said panel end and configured for being the points of fixed engagement with the panel without causing yielding of the panel or of said fastener.

19. The fastener of claim 18 wherein the lugs project from said peripheral edge equally spaced from one another.

20. The fastener of claim 18 wherein said lugs project radially from said panel end.

* * * * *